US008489588B2

(12) United States Patent
Figueroa et al.

(10) Patent No.: US 8,489,588 B2
(45) Date of Patent: Jul. 16, 2013

(54) INTERACTIVE VISUALIZATION OF SENDER AND RECIPIENT INFORMATION IN ELECTRONIC COMMUNICATIONS

(75) Inventors: Sarah Christine Figueroa, San Jose, CA (US); Kenney Ng, Littleton, MA (US); Thyra Lynne Rauch, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 12/643,953

(22) Filed: Dec. 21, 2009

(65) Prior Publication Data

US 2011/0153635 A1 Jun. 23, 2011

(51) Int. Cl.
*G06F 17/30* (2006.01)
(52) U.S. Cl.
USPC ............ 707/726; 707/797; 707/798; 707/803
(58) Field of Classification Search
USPC ................ 707/736, 734, 747, 726, 797, 798, 707/803; 370/254; 709/206
See application file for complete search history.

(56) References Cited

U.S. PATENT DOCUMENTS

| 6,594,673 | B1 * | 7/2003 | Smith et al. ............................ 1/1 |
| 7,359,894 | B1 * | 4/2008 | Liebman et al. ....................... 1/1 |
| 7,421,660 | B2 | 9/2008 | Charnock et al. ............. 715/751 |
| 7,606,168 | B2 * | 10/2009 | Robinson et al. ............. 370/254 |
| 7,664,821 | B1 * | 2/2010 | Ancin et al. ................... 709/206 |
| 8,224,862 | B2 * | 7/2012 | Sacks ............................. 707/797 |
| 2004/0054737 | A1 * | 3/2004 | Daniell ......................... 709/206 |
| 2006/0173824 | A1 * | 8/2006 | Bensky et al. ..................... 707/3 |
| 2006/0173957 | A1 * | 8/2006 | Robinson et al. ............. 709/204 |
| 2006/0179041 | A1 * | 8/2006 | Ohi et al. .......................... 707/3 |
| 2007/0028189 | A1 | 2/2007 | Robbins ........................ 715/853 |
| 2008/0082578 | A1 | 4/2008 | Hogue et al. ............... 707/104.1 |
| 2008/0104225 | A1 | 5/2008 | Zhang et al. .................. 709/224 |
| 2009/0158429 | A1 * | 6/2009 | Alstyne et al. .................. 726/22 |
| 2010/0042944 | A1 * | 2/2010 | Robinson et al. ............. 715/771 |
| 2010/0093317 | A1 * | 4/2010 | Ghotge et al. ............. 455/414.1 |

OTHER PUBLICATIONS

Heer et al., "Vizster: Visualizing Online Social Networks," IEEE Symposium on Information Visualization 2005, Oct. 23-25, 2005, pp. 32-29, INSPEC Accession No. 8834251.

* cited by examiner

*Primary Examiner* — Sherief Badawi
(74) *Attorney, Agent, or Firm* — VanLeeuwen & VanLeeuwen; Joseph C. Polimeni

(57) ABSTRACT

An approach is provided that visually distinguishes between entity types in a communication system. A Data store with entities is queried, with entities connected to one another as senders and receivers, resulting in a query result. A node data structure corresponding to each of the entities is created and an edge data structure corresponding to each of the connections between the entities is also created. Nodes corresponding to the node data structures are displayed, along with edges (e.g., connection lines) corresponding to the edge data structures. A user selects one of the nodes that is displayed, and the selected node is visually highlighted. Different types of nonselected nodes are identified based on the selected node. Types of nodes may include sender type nodes, receiver type nodes, and sender/receiver type nodes. The types of identified nodes are highlighted in a manner that visually distinguishes each type from the other types.

3 Claims, 9 Drawing Sheets

INTERACTIVE VISUALIZATION OF SENDER AND RECIPIENT INFORMATION IN ELECTRONIC COMMUNICATIONS

BACKGROUND OF THE INVENTION

1. Technical Field

The present invention relates to an approach for visualizing sender and recipient information in electronic communications, such as emails, in an interactive fashion.

2. Description of the Related Art

Searching vast quantities of information using a search engine or database query language often produces large amounts of results that can be difficult to analyze by an end user. Large quantities of information can result in "information overload." Active users have the ability to consume large amounts of data stored in large, online data stores, such as email repositories. Information overload caused by consuming such large amounts of information can cause the users to fail to comprehend the validity of the content and risks misinformation. Misinformation can ultimately cause poor decision making caused by a lack of understanding of the underlying information. Modern computer systems, such as email systems, often exacerbate information overload by rapidly creating new data elements, such as email messages. The rapid increase in the amount of information leads to large amounts of historical data needing to be processed in order to understand the information at hand.

SUMMARY

An approach is provided that visually distinguishes between entity types in a communication system. A data store with several entities is queried, with entities connected to one another as senders and receivers. The querying results in a query result. A node data structure corresponding to each of the entities is created and an edge data structure corresponding to each of the connections between the entities is also created. Nodes corresponding to the node data structures are displayed along with edges (e.g., connection lines) corresponding to the edge data structures. A user selects one of the nodes that is displayed on the display screen. The selected node is visually highlighted. Different types of non-selected nodes are identified based on the selected node. The different types of nodes may include any of sender type nodes, receiver type nodes, and sender/receiver type nodes. The different types of identified non-selected nodes are visually highlighted in a manner that visually distinguishes each type from the other types.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
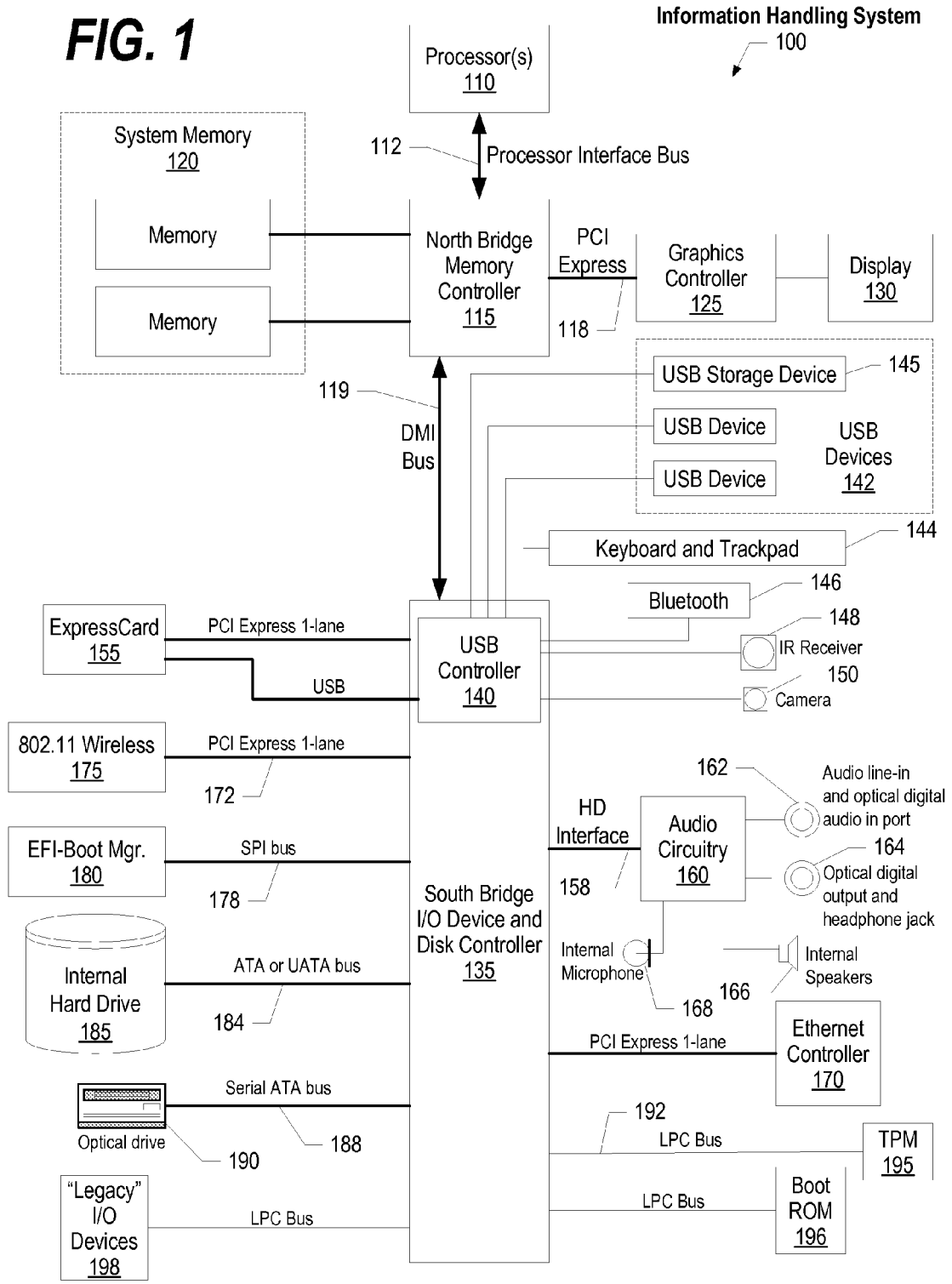
FIG. 1 is a block diagram of a data processing system in which the methods described herein can be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
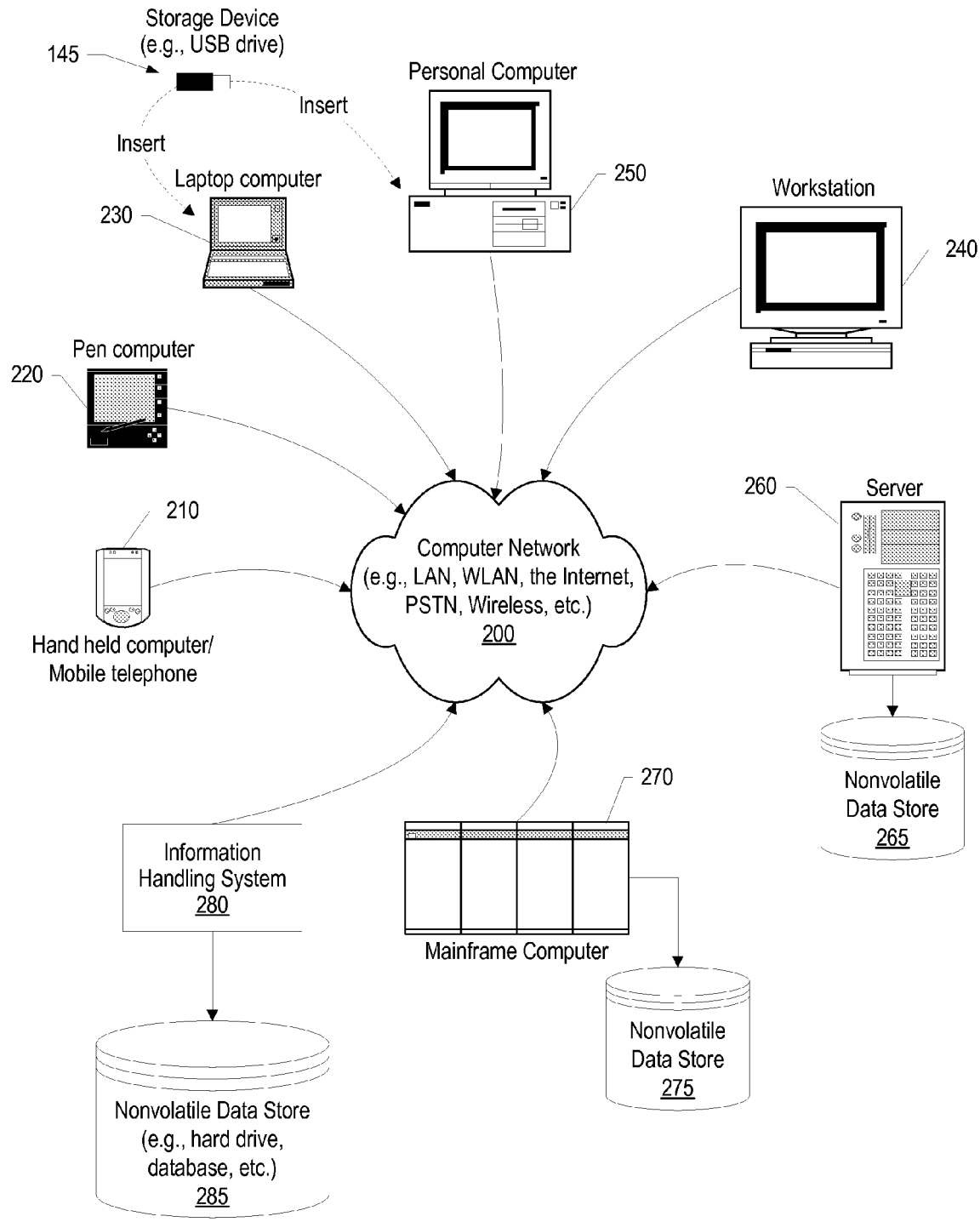
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wirelessly communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, mobile internet device, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
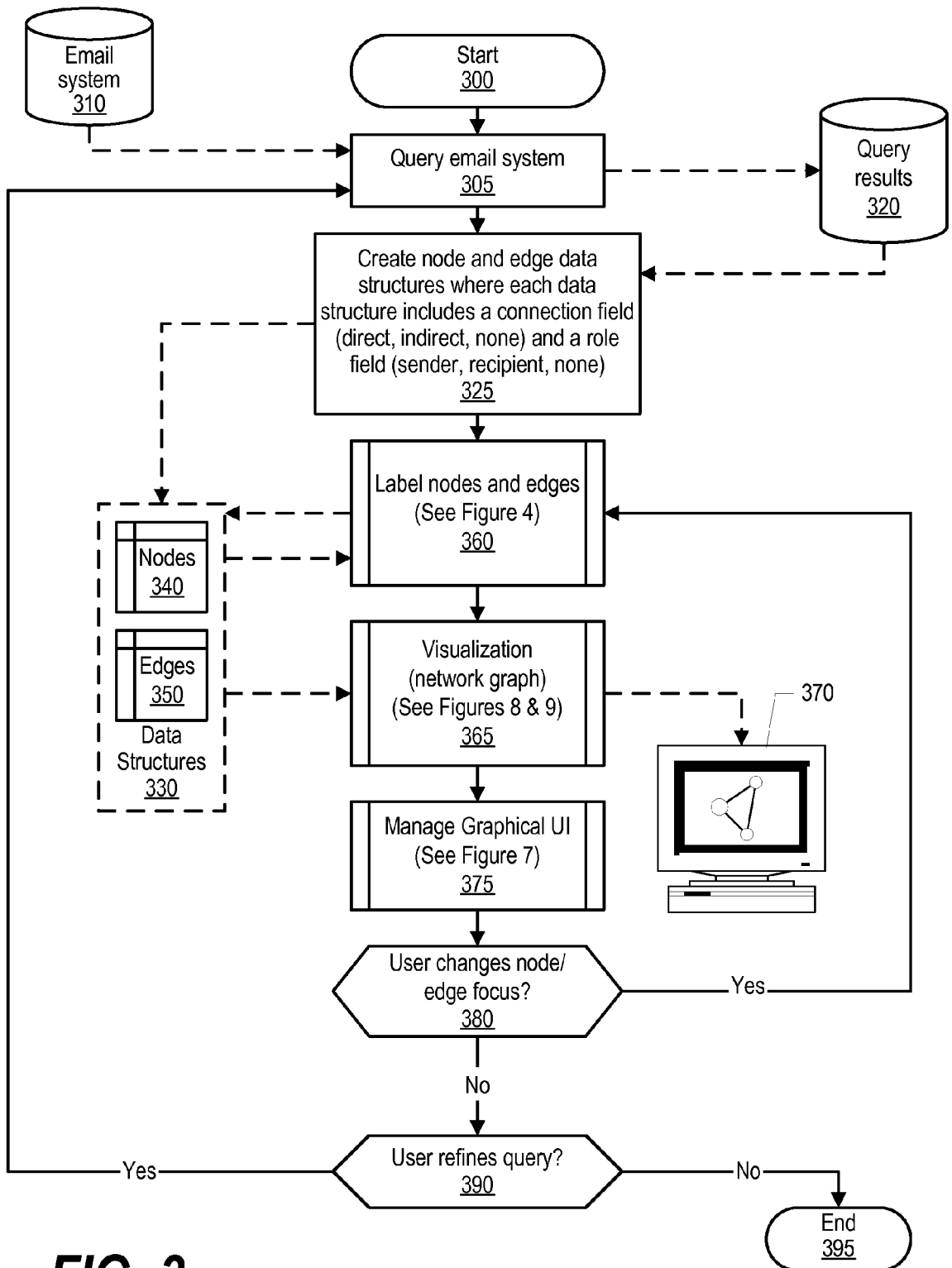
FIG. 3 is a high level flowchart showing a data source (email) being processed for visualization.

FIG. 3 is a high level flowchart showing a data source (email) being processed for visualization. Processing commences at 300 whereupon, at step 305, a user queries data stored in an electronic communications system, such as an email system (email system data store 310). For example, any emails with a particular keyword could be searched with the query. The results of the query are stored in query results data store 320. At step 325, data store 330, including nodes data structure 340 and edges data structure 350, are created. In one embodiment, each node and edge data structure includes a connection field that is used to identify the type of connection of the node or edge such as a direct connection, an indirect connection, or no connection to a focus node that is selected by the user. In addition, in this embodiment, each node and edge data structure includes a role field that identifies whether the node or edge is a sender to the focus node, a recipient from the focus node, a sender/recipient to the focus node, or if the role is "none" for the node or edge. Initially, the data structures are created and the values are set to "none" as the user has not yet selected a focus node. The nodes and edges are labeled at predefined process 360 (see FIG. 4 and corresponding text for processing details). A network graph is created and displayed to the user at predefined process 365 (see FIGS. 8 and 9 and corresponding text for processing details). The visual network graph is displayed on display screen 370. At predefined process 375, the graphical user interface displayed on the display screen is managed by handling user selections of nodes and edges (see FIG. 7 and corresponding text for processing details).

A determination is made as to whether the user has changed the node or edge focus by selecting a new node or edge (decision 380). If the user changes the focus, then decision 380 branches to the "yes" branch which loops back to re-label the nodes and edges (predefined process 360), update the visual network graph (predefined process 365), and continue managing the graphical user interface (predefined process 375). On the other hand, if the user did not change the focus, then decision 380 branches to the "no" branch whereupon a determination is made as to whether the user has refined the search query or has terminated the process (decision 390). If the user refined the search query, then decision 390 branches to the "yes" branch which loops back to re-query the communication system using the new search criteria and the new search criteria is processed as described above. This looping continues until the user is finished, at which point decision 390 branches to the "no" branch and processing terminates at 395.

Figure 4:
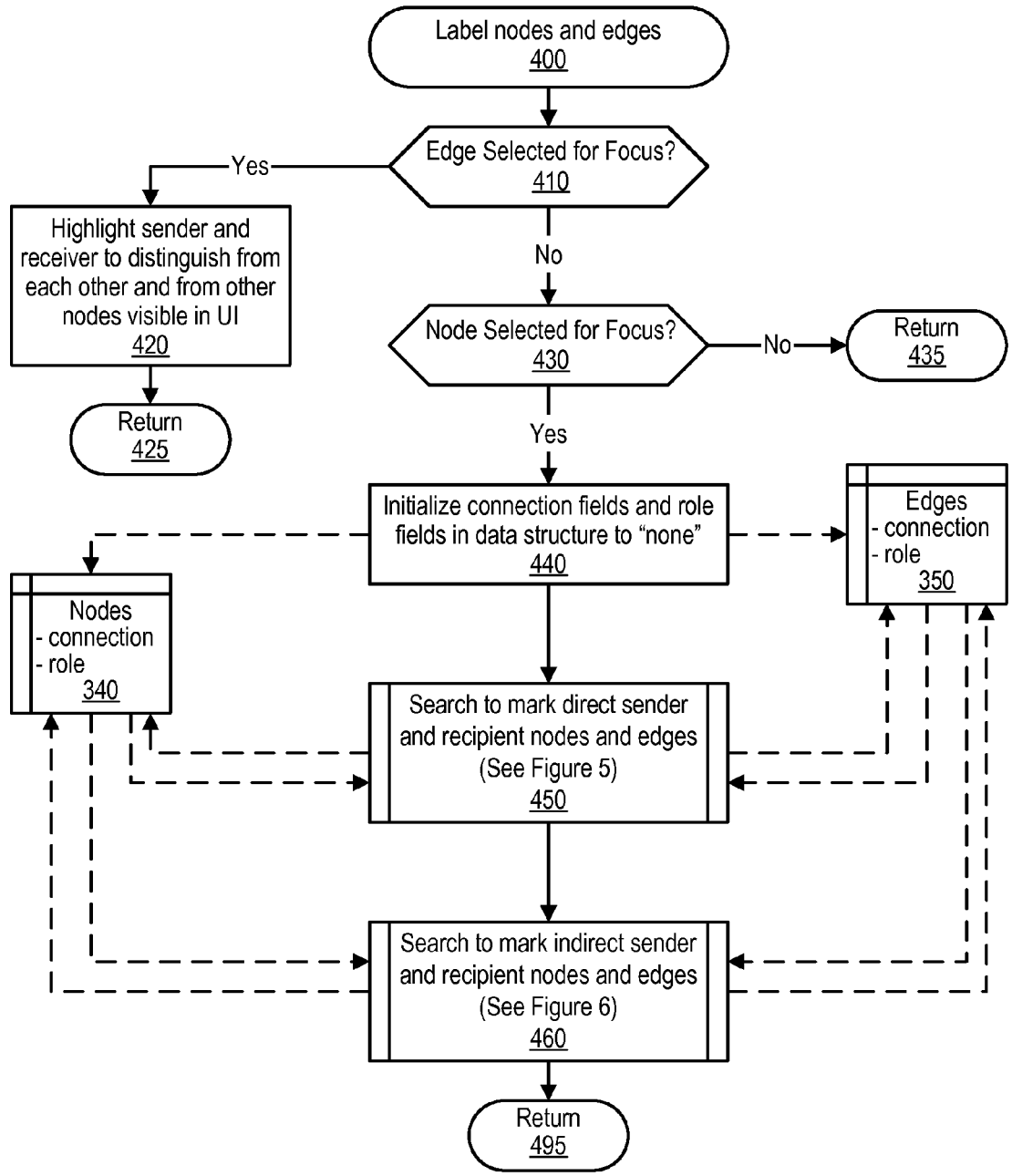
FIG. 4 is a flowchart showing steps taken to label the nodes and edges in a network graph that describes the data.

FIG. 4 is a flowchart showing steps taken to label the nodes and edges in a network graph that describes the data. Processing commences at 400 whereupon a determination is made as to whether an edge has been selected by the user for focus (decision 410). If the user has selected an edge for focus, then decision 410 branches to the "yes" branch whereupon, at step 420, processing highlights the sender and receiver connected by the selected edge in order to distinguish the sender and receiver from each other and from other nodes being displayed on the display screen. Processing then returns to the calling routine (see FIG. 3) at 425. On the other hand, if an edge was not selected by the user for focus, then decision 410 branches to the "no" branch whereupon a determination is made as to whether the user has selected a node for focus (decision 430). If the user did not select a node for focus, then decision 430 branches to the "no" branch whereupon processing returns to the calling routine (see FIG. 3) at 435.

Figure 8:
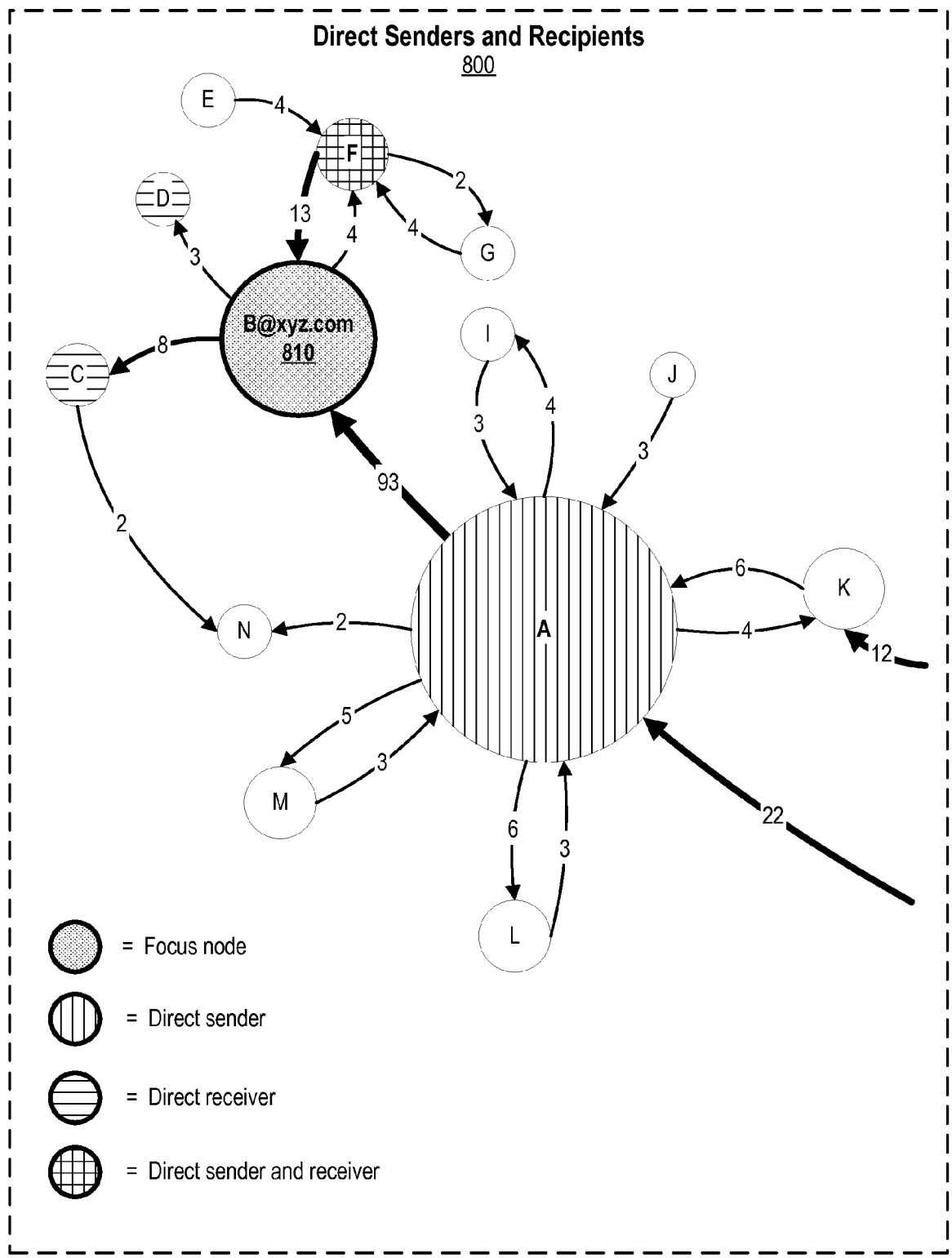
FIG. 8 is an example of a network diagram showing visualization of direct senders and recipients based on a selected focus node.

If the user has selected a node for focus, then decision 430 branches to the "yes" branch whereupon, at step 440, the connection and role fields in nodes data structure 340 and edge data structure are initialized to "none" indicating that nodes and edges currently have no connections and no roles. At predefined process 450, node data structure 340 and edge data structure 350 are searched to mark the direct sender nodes and edges and the direct recipient nodes and edges to the selected focus node (see FIG. 5 and corresponding text for processing details). Direct nodes are those nodes (e.g., email addresses) that have directly sent or received one or more electronic communications with the focus node. Likewise, direct edges are the edges that connect the direct nodes to the focus node. The identified direct senders and recipients are recorded in the respective node and edge data structures 340 and 350. FIG. 8 includes a visual example of direct nodes and edges.

Figure 6:
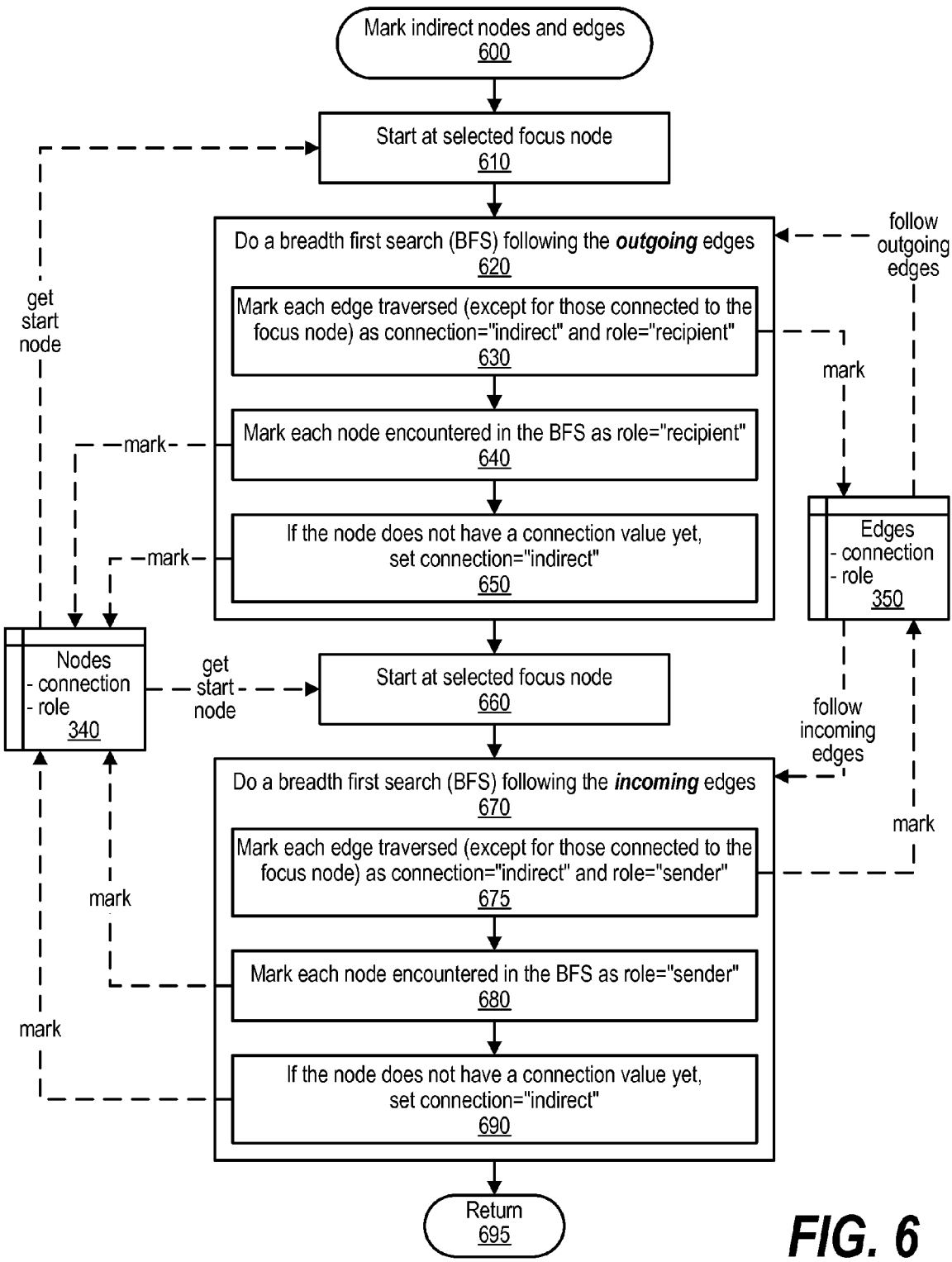
FIG. 6 is a flowchart showing steps taken to mark indirect nodes and edges based on a selected focus node.
Figure 9:
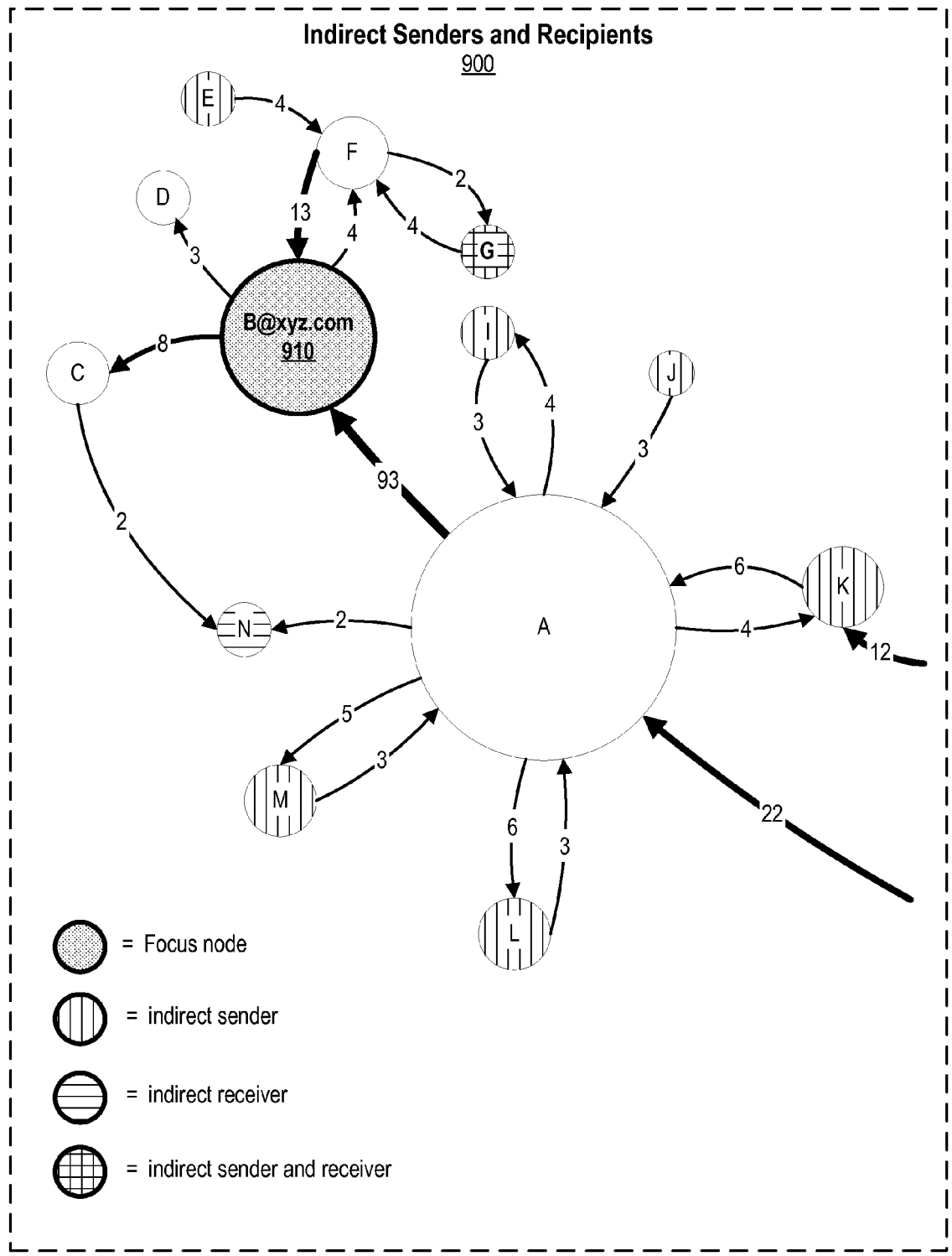
FIG. 9 is an example of a network diagram showing visualization of indirect senders and recipients based on a selected focus node.

At predefined process 460, node data structure 340 and edge data structure 350 are searched to mark the indirect sender nodes and edges and the indirect recipient nodes and edges to the selected focus node (see FIG. 6 and corresponding text for processing details). Indirect nodes are those nodes (e.g., email addresses) that have indirectly sent or received one or more electronic communications with the focus node. Likewise, indirect edges are the edges that connect the indirect nodes. The identified indirect senders and recipients are recorded in the respective node and edge data structures 340 and 350. FIG. 9 includes a visual example of direct nodes and edges. Processing then returns to the calling routine (FIG. 3) at 495.

Figure 5:
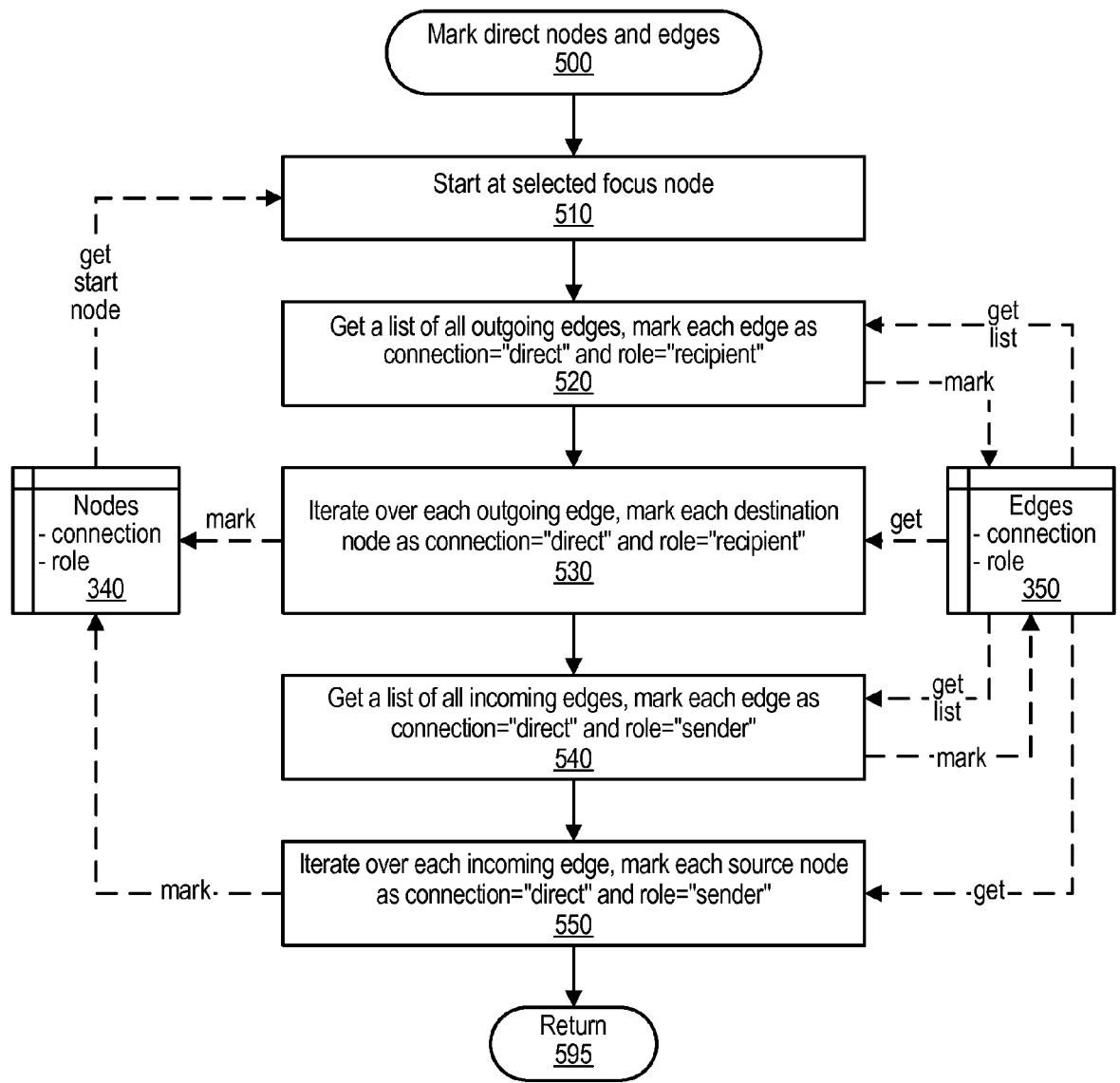
FIG. 5 is a flowchart showing steps taken to mark direct nodes and edges based on a selected focus node.

FIG. 5 is a flowchart showing steps taken to mark direct nodes and edges based on a selected focus node. Processing commences at 500 whereupon, at step 510, the node selected by the user is retrieved from nodes data structure 340 and used as a starting point. At step 520, a list of all of the outgoing edges emanating from the selected focus node (the outgoing edges) are retrieved from edge data structure 350 and each of these edges has its connection field updated to indicate that the edge is a "direct" edge of the selected node and each of the roles is updated to indicate that the edge is a "recipient" edge of the selected node. At step 530, each of the edges emanating from the selected focus node is iterated over to retrieve the non-selected node that the edge connects to the selected focus node. Each of these non-selected nodes is updated to indicate that the node is a "direct" node to the selected node and each of the roles is updated to indicate that the node is a "recipient" node to the selected node.

At step 540, a list of all of the incoming edges that connect to the selected focus node is retrieved from edge data structure 350 and each of these edges has its connection field updated to indicate that the edge is a "direct" edge of the selected node and each of the roles is updated to indicate that the edge is a "sender" edge to the selected node. At step 550, each of the incoming edges to the selected focus node is iterated over to retrieve the non-selected node that the edge connects to the selected focus node. Each of these non-selected nodes is updated to indicate that the node is a "direct" node to the selected node and each of the roles is updated to indicate that the node is a "sender" node to the selected node. Note that non-selected nodes can both be a direct "sender" and a direct "receiver" of electronic communication with the selected node, in which case the role will be "sender/receiver" indicating that both roles apply to these nodes. Likewise, edges that are both "receiver" and "sender" roles are also marked as "sender/receiver" edges indicating that both roles apply to these edges. Processing then returns to the calling routine (FIG. 4) at 595.

FIG. 6 is a flowchart showing steps taken to mark indirect nodes and edges based on a selected focus node. Processing commences at 600 whereupon, at step 610, the marking of indirect nodes and edges starts with the node selected by the user. At step 620, a "breadth first search" (BFS) is performed following the outgoing edges from the selected node. In graph theory, a breadth-first search is a graph search algorithm that begins at the selected node and explores all the neighboring nodes. Then for each of those nearest nodes, it explores their unexplored neighbor nodes, and so on, until all the displayed nodes are processed. Edge data structure 350 is updated so that each edge that is traversed, except for the edge connected to the selected node, is marked with a connection of "indirect" in relation to the selected node and a role as "recipient" in relation to the selected node. At step 640, node data structure 340 is updated so that each node that is encountered during the breadth first search is marked with a role as "recipient." At step 650, if the non-selected node does not yet have a connection value (e.g., the connection value is currently "none"), then data structure 340 is updated so that the connection value is set to "indirect." At this point, the outgoing indirect edges and nodes have been marked and processing turns to marking the incoming edges and nodes.

At step 660, processing again starts back at the selected focus node. At step 670, another breadth first search is performed, this time following the incoming edges to the selected focus node. While following the incoming edges, at step 675, edge data structure 350 is updated with each edge that is traversed being marked, except for those directly connected to the selected focus node, with a connection type of "indirect" and a role of "sender." At step 680, nodes data structure is updated and each node that is encountered during the breadth first search of step 670 is marked with a role of "sender." At step 690, if the encountered node does not have a connection value yet (e.g., the connection value is "none"), then the connection value is set to "indirect" indicating an indirect relationship to the selected focus node.

Note that non-selected nodes can both be an indirect "sender" and an indirect "receiver" of electronic communication with the selected node, in which case the role will be "sender/receiver" indicating that both roles apply to these nodes. Note also that edges can be for both a "receiver" and a "sender" of electronic communication between nodes so that these edges are also marked as "sender/receiver" edges indicating that both roles apply to these edges. Processing then returns to the calling routine (FIG. 4) at 695.

Figure 7:
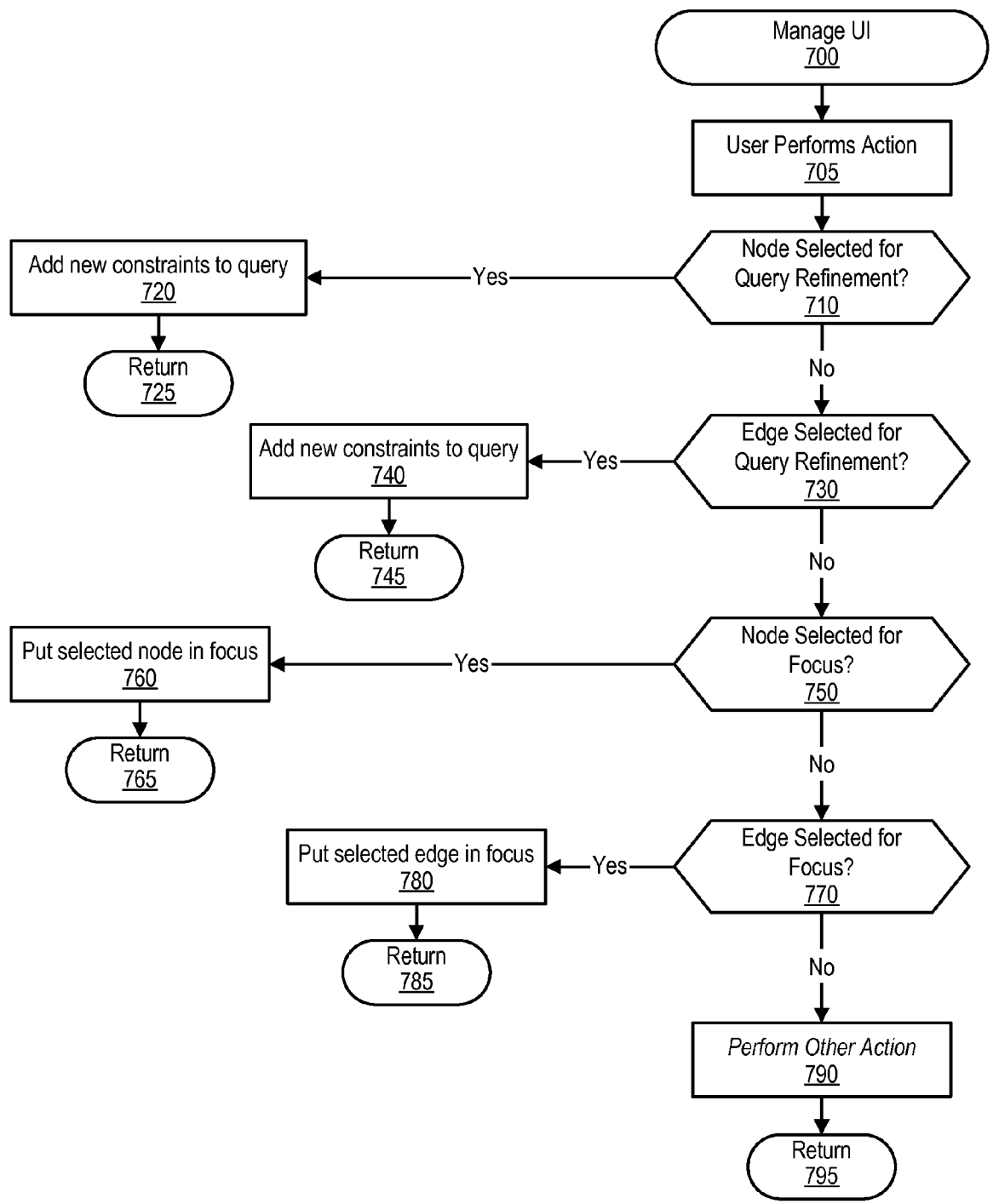
FIG. 7 is a flowchart showing steps taken to manage the user interface.

FIG. 7 is a flowchart showing steps taken to manage the user interface. Processing commences at 700 whereupon, at step 705, an action is performed by the user and detected by the system. A determination is made as to whether a node has been selected by the user for query refinement (decision 710). If a node has been selected for query refinement, then decision 710 branches to the "yes" branch whereupon, at step 720, new constraints are added to the query and processing returns to the calling routine (FIG. 3) to update the query and query results at 725. On the other hand, if a node was not selected for query refinement, then decision 710 branches to the "no" branch whereupon a determination is made as to whether an edge was selected for query refinement (decision 730). If an edge was selected for query refinement, then decision 730 branches to the "yes" branch whereupon, at step 740, new constraints are added to the query and processing returns to the calling routine (FIG. 3) to update the query and query results at 745.

On the other hand, if the user is not refining the query, then decision 730 branches to the "no" branch whereupon a determination is made as to whether the user has selected a node for focus (decision 750). If the user has selected a node for focus, then decision 750 branches to the "yes" branch whereupon, at step 760, the node selected by the user is put into focus (becoming the selected node) and processing returns to the calling routine (FIG. 3) to update the new focus node at return 765. On the other hand, if a new node was not selected, then decision 750 branches to the "no" branch whereupon at step 770 a determination is made as to whether the user has selected an edge for focus (decision 770). If the user has selected an edge for focus, then decision 770 branches to the "yes" branch whereupon, at step 780, the selected edge is put into focus and processing returns to the calling routine (FIG. 3) to update the new focus edge at return 785. On the other hand, if neither a query refinement or a node/edge selection was made by the user, then decision 770 branches to the "no" branch whereupon, at step 790, some other graphical user interface action is handled. Processing then returns to the calling routine (FIG. 3) at 795.

FIG. 8 is an example of a network diagram showing visualization of direct senders and recipients based on a selected focus node. Direct senders and receivers diagram 800 shows a number of nodes and edges (edges being the lines connecting the nodes). Nodes are labeled "A" through "N" and edges are labeled with the number of communications between nodes. In addition, the edge thickness distinguishes between edges so that edges with more communications appear as wider (thicker) lines and those with fewer communications appear as narrower (thinner) lines. In the example, the user has selected node "B" (810) as the focus node. The selected "focus" node is highlighted, in the example, with a solid gray pattern. Non-selected nodes that are direct senders, receivers and senders/receivers are highlighted in a manner that distinguishes the types of nodes from each other. In the example, non-selected nodes that are direct senders are highlighted with a vertical pattern, non-selected nodes that are direct receivers are highlighted with a horizontal pattern, and non-selected nodes that are both direct senders and direct receivers are highlighted with both horizontal and vertical patterns creating a checkered pattern. Note that because the non-selected highlighted nodes are "direct" senders and/or receivers, each of these nodes has an edge that directly connects to the selected focus node 810. In addition, while not appearing in FIG. 8, the edges between nodes can be highlighted to indicate the different types. For example, a red edge line can indicate a "receiver," a green edge line can indicate a "sender," and a blue edge line can indicate that an edge is a "sender/receiver."

FIG. 9 is an example of a network diagram showing visualization of indirect senders and recipients based on a selected focus node. Indirect senders and receivers diagram 900 shows the same edges and nodes that were presented in FIG. 8. By way of comparison, in FIG. 9, indirect relationships are highlighted instead of direct relationships. Nodes are once again labeled "A" through "N" and edges are labeled with the number of communications between nodes. In addition, the edge thickness distinguishes between edges so that edges with more communications appear as wider (thicker) lines and those with fewer communications appear as narrower (thinner) lines. In the example, the user has once again selected node "B" (910) as the focus node. The selected "focus" node is highlighted, in the example, with a solid gray pattern. Non-selected nodes that are indirect senders, receivers and senders/receivers are highlighted in a manner that distinguishes the types of nodes from each other. In the example, non-selected nodes that are indirect senders are highlighted with a vertical pattern, non-selected nodes that are indirect receivers are highlighted with a horizontal pattern, and non-selected nodes that are both indirect senders and indirect receivers are highlighted with both horizontal and vertical patterns creating a checkered pattern. Note that because the non-selected highlighted nodes are "indirect" senders and/or receivers, none of these nodes has an edge that directly connects to selected focus node 810. In addition, while not appearing in FIG. 9, the edges between nodes can be highlighted to indicate the different types. For example, a red edge line can indicate a "receiver," a green edge line can indicate a "sender," and a blue edge line can indicate that an edge is a "sender/receiver."

One of the implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:

querying a data store containing entities, wherein a plurality of the entities are each connected to one or more other entities included in the data store, the querying resulting in a query result;

creating a node data structure corresponding to each of a plurality of entities included in the query result and an edge data structure corresponding to each of the connections of the one or more entities included in the query result, wherein each node data structure includes a connection field and a role field, and wherein each edge data structure includes a connection field and a role field;

displaying a plurality of nodes corresponding to the created node data structures and a plurality of edges corresponding to the created edge data structures on a display;

receiving a node selection corresponding to one of the displayed nodes from a user;

visually highlighting the selected node on the display;

updating the connection field corresponding to the plurality of nodes so that a connection type is identified from a group consisting of a direct type, an indirect type, and no type, and updating the role field corresponding to the plurality of nodes so that a role type is identified from a group consisting of a sender, a receiver, both a sender and a receiver, and no role;

identifying a first set of one or more edges that are outgoing from the selected node in relation to the selected node and marking each of the role fields for each of the first set of identified edges as a recipient type edge;

identifying a second set of one or more edges that are incoming to the selected node in relation to the selected node and marking each of the role fields for each of the second set of identified edges as a sender type edge;

setting the connection fields of each of the edges in the first and second sets that are directly connected to the selected node as direct connections;

setting the connection fields of each of the edges in the first and second sets that are not directly connected to the selected node as indirect connections;

identifying one or more types of non-selected nodes in relation to the selected node, wherein one or more of the non-selected nodes are identified as being an indirect sender type to the selected node, one or more of the non-selected nodes as being an indirect receiver type to the selected node, and one or more of the non-selected nodes as being both the indirect sender type and the indirect receiver type to the selected node; and visually highlighting the identified non-selected nodes in a manner that visually distinguishes each type from the other types, wherein a first highlighting is applied to non-selected nodes identified as being the indirect sender type, a second highlighting is applied to non-selected nodes identified as being the indirect receiver type, and a third highlighting is applied to non-selected nodes identified as being both the indirect sender type and the indirect receiver type.

2. An information handling system comprising:

one or more processors;

a memory accessible by at least one of the processors;

a nonvolatile storage medium accessible by at least one of the processors;

a display device accessible by at least one of the processors; and a set of instructions stored in the memory and executed by at least one of the processors in order to perform actions of:

querying a data store containing entities, wherein a plurality of the entities are each connected to one or more other entities included in the data store, the querying resulting in a query result;

creating a node data structure corresponding to each of a plurality of entities included in the query result and an edge data structure corresponding to each of the connections of the one or more entities included in the query result, wherein each node data structure includes a connection field and a role field, and wherein each edge data structure includes a connection field and a role field;

displaying a plurality of nodes corresponding to the created node data structures and a plurality of edges corresponding to the created edge data structures on the display device;

receiving a node selection corresponding to one of the displayed nodes from a user;

visually highlighting the selected node on the display device;

updating the connection field corresponding to the plurality of nodes so that a connection type is identified from a group consisting of a direct type, an indirect type, and no type, and updating the role field corresponding to the plurality of nodes so that a role type is identified from a group consisting of a sender, a receiver, both a sender and a receiver, and no role;

identifying a first set of one or more edges that are outgoing from the selected node in relation to the selected node and marking each of the role fields for each of the first set of identified edges as a recipient type edge;

identifying a second set of one or more edges that are incoming to the selected node in relation to the selected node and marking each of the role fields for each of the second set of identified edges as a sender type edge;

setting the connection fields of each of the edges in the first and second sets that are directly connected to the selected node as direct connections;

setting the connection fields of each of the edges in the first and second sets that are not directly connected to the selected node as indirect connections;

identifying one or more types of non-selected nodes in relation to the selected node, wherein one or more of the non-selected nodes are identified as being an indirect sender type to the selected node, one or more of the non-selected nodes as being an indirect receiver type to the selected node, and one or more of the non-selected nodes as being both the indirect sender type and the indirect receiver type to the selected node; and visually highlighting the identified non-selected nodes in a manner that visually distinguishes each type from the other types, wherein a first highlighting is applied to non-selected nodes identified as being the indirect sender type, a second highlighting is applied to non-selected nodes identified as being the indirect receiver type, and a third highlighting is applied to non-selected nodes identified as being both the indirect sender type and the indirect receiver type.

3. A computer program product comprising:

a computer readable memory device;

first program instructions to query a data store containing entities, wherein a plurality of the entities are each connected to one or more other entities included in the data store, the querying resulting in a query result;

second program instructions to create a node data structure corresponding to each of a plurality of entities included in the query result and an edge data structure corresponding to each of the connections of the one or more entities included in the query result, wherein each node data structure includes a connection field and a role field, and wherein each edge data structure includes a connection field and a role field;

third program instructions to display a plurality of nodes corresponding to the created node data structures and a plurality of edges corresponding to the created edge data structures on a display;

fourth program instructions to receive a node selection corresponding to one of the displayed nodes from a user;

fifth program instructions to visually highlight the selected node on the display;

sixth program instructions to update the connection field corresponding to the plurality of nodes so that a connection type is identified from a group consisting of a direct type, an indirect type, and no type, and updating the role field corresponding to the plurality of nodes so that a role type is identified from a group consisting of a sender, a receiver, both a sender and a receiver, and no role;

seventh program instructions to identify a first set of one or more edges that are outgoing from the selected node in relation to the selected node and marking each of the role fields for each of the first set of identified edges as a recipient type edge;

eighth program instructions to identify a second set of one or more edges that are incoming to the selected node in relation to the selected node and marking each of the role fields for each of the second set of identified edges as a sender type edge;

ninth program instruction to set the connection fields of each of the edges in the first and second sets that are directly connected to the selected node as direct connections;

tenth program instructions to set the connection fields of each of the edges in the first and second sets that are not directly connected to the selected node as indirect connections;

eleventh program instructions to identify one or more types of non-selected nodes in relation to the selected node, wherein one or more of the non-selected nodes are identified as being an indirect sender type to the selected node, one or more of the non-selected nodes as being an indirect receiver type to the selected node, and one or more of the non-selected nodes as being both the indirect sender type and the indirect receiver type to the selected node;

twelfth program instructions to visually highlight the identified non-selected nodes in a manner that visually distinguishes each type from the other types, wherein a first highlighting is applied to non-selected nodes identified as being the indirect sender type, a second highlighting is applied to non-selected nodes identified as being the indirect receiver type, and a third highlighting is applied to non-selected nodes identified as being both the indirect sender type and the indirect receiver type; and wherein the first, second, third, fourth, fifth, sixth, seventh, eighth, ninth, tenth, eleventh, and twelfth program instructions are stored on the computer readable memory device.

\* \* \* \* \*